United States Patent
Di Ronza et al.

(10) Patent No.: US 9,623,618 B2
(45) Date of Patent: Apr. 18, 2017

(54) METHOD TO PREPARE TREADS FOR TYRES, RUBBER COMPOUND, TREAD PORTION AND WINTER TYRE

(71) Applicant: BRIDGESTONE CORPORATION, Tokyo (JP)

(72) Inventors: Raffaele Di Ronza, Rome (IT); Alessandra Calzetta, Rome (IT)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/038,773

(22) PCT Filed: Nov. 25, 2014

(86) PCT No.: PCT/IB2014/066332
§ 371 (c)(1),
(2) Date: May 24, 2016

(87) PCT Pub. No.: WO2015/075701
PCT Pub. Date: May 28, 2015

(65) Prior Publication Data
US 2017/0001398 A1    Jan. 5, 2017

(30) Foreign Application Priority Data
Nov. 25, 2013 (IT) .............. RM2013A0649

(51) Int. Cl.
*B29D 30/52* (2006.01)
*B60C 1/00* (2006.01)
(Continued)

(52) U.S. Cl.
CPC .............. *B29D 30/52* (2013.01); *B29B 13/04* (2013.01); *C08K 3/36* (2013.01); *C08L 9/06* (2013.01);
(Continued)

(58) Field of Classification Search
CPC ......... B60C 1/00; B60C 1/0016; B29D 30/52; B29B 17/04
See application file for complete search history.

(56) References Cited

U.S. PATENT DOCUMENTS

| | | |
|---|---|---|
| 4,863,106 A | 9/1989 | Perkel |
| 6,407,180 B1 | 6/2002 | Wideman et al. |
| | (Continued) | |

FOREIGN PATENT DOCUMENTS

| | | |
|---|---|---|
| DE | 24 32 615 A1 | 1/1976 |
| DE | 20 2012 006 254 U1 | 10/2012 |
| | (Continued) | |

OTHER PUBLICATIONS

International Search Report for PCT/IB2014/066332 dated Mar. 16, 2015.
(Continued)

*Primary Examiner* — Vu A Nguyen
(74) *Attorney, Agent, or Firm* — Sughrue Mion, PLLC

(57) ABSTRACT

A method of producing a rubber compound for a tread portion designed to assume, with use, a porous surface with a 75 to 800 μm pore area. The method includes a first mixing step, in which a polymer base, recycled rubber, and silica are mixed together; and a second mixing step, in which a curing system is added and mixed to the compound from the first mixing step. 5 to 20 phr of recycled rubber is added at the first mixing step. The recycled rubber is 75 to 800 um in size, and is treated beforehand cryogenically. And the polymer base is selected from SBR, BR, NR and mixtures thereof. The invention also relates to a rubber compound for producing a tread portion, a tread portion and a winter tire comprising said tread portion.

3 Claims, 1 Drawing Sheet

(51) Int. Cl.
  *B29B 17/04* (2006.01)
  *C08L 7/00* (2006.01)
  *C08L 9/00* (2006.01)
  *B29B 13/04* (2006.01)
  *C08K 3/36* (2006.01)
  *C08L 9/06* (2006.01)
  *B29K 105/26* (2006.01)

(52) U.S. Cl.
  CPC ..... *B29K 2105/26* (2013.01); *C08L 2205/025* (2013.01); *C08L 2205/14* (2013.01)

(56) References Cited

U.S. PATENT DOCUMENTS

| | | | |
|---|---|---|---|
| 6,479,558 B1 | 11/2002 | Fliermans | |
| 2011/0172365 A1* | 7/2011 | Meredith | B60C 1/00 525/236 |

FOREIGN PATENT DOCUMENTS

| | | |
|---|---|---|
| GB | 2 006 048 A | 5/1979 |
| WO | 97/07893 A1 | 3/1997 |
| WO | 2009/137585 A2 | 11/2009 |
| WO | 2010/039327 A1 | 4/2010 |

OTHER PUBLICATIONS

Written Opinion for PCT/IB2014/066332 dated Mar. 16, 2015.
Written Opinion for PCT/IB2014/066332 dated Dec. 11, 2015.

\* cited by examiner

METHOD TO PREPARE TREADS FOR TYRES, RUBBER COMPOUND, TREAD PORTION AND WINTER TYRE

CROSS REFERENCE TO RELATED APPLICATIONS

This application is a National Stage of International Application No. PCT/IB2014/066332 filed Nov. 25, 2014, claiming priority based on Italian Patent Application No. RM2013A000649 filed Nov. 25, 2013, the contents of all of which are incorporated herein by reference in their entirety.

TECHNICAL FIELD

The present invention relates to a tyre tread production method.

BACKGROUND ART

One long-used method of improving tyre grip in wet-road and winter conditions is to form a porous surface on the tread. The pores increase the tread-road contact area, as well as allowing run-off of the water layer that forms between the tread and the road surface.

To obtain a porous-surface tread, the common practice in the rubber industry is to add to the compound, as it is being made, specific chemical agents which, at the curing stage, produce chemical reactions releasing pore-forming gases.

This solution has both cost and processing drawbacks, the former because of the chemical agents added to the compound, and the latter by having to constantly control the temperature of the compound as it is processed, to prevent the chemical agents from reacting prior to the curing stage.

A need is therefore felt for a method of producing a tread with a given porosity, while at the same time avoiding the drawbacks of the known art.

The Applicant has surprisingly discovered that using given amounts of recycled rubber in the form of granules of given size produces tyre treads with the required degree of porosity, but without incurring the drawbacks of the known art.

More specifically, the Applicant has devised a method of producing tread portions capable of acquiring the required surface porosity in actual use.

One of the original aspects of the present invention, in fact, lies in obtaining a tread of given porosity using a completely different strategy from that adopted so far. That is, as opposed to producing a tread portion with the required winter-tyre porosity from the outset, the present invention provides for producing a tread portion that achieves the required porosity with actual use, thus eliminating the use of chemical agents for producing pores at the curing stage.

DISCLOSURE OF INVENTION

According to the present invention, there is provided a method of producing a rubber compound for a tread portion designed to assume, with use, a porous surface with a 75 to 800 µm pore area; said method comprising a first mixing step, in which a polymer base, recycled rubber, and silica are mixed together, and a second mixing step, in which a curing system is added and mixed to the compound from the first mixing step; said method being characterized in that 5 to 20 phr of said recycled rubber is added at said first mixing step; said recycled rubber being 75 to 800 µm in size, and being treated beforehand cryogenically; and said polymer base being selected from SBR, BR, NR and mixtures thereof.

Using over 20 phr of recycled rubber has been found to produce an excessively porous tread portion, so much so as to compromise its use.

Also, recycled rubber treated other than cryogenically fails to achieve the required porosity, probably by over-interacting with the polymer base.

Here and hereinafter, the term 'curing system' is intended to mean a combination of ingredients, comprising at least sulphur and accelerants, which are added to the compound at the final mixing stage to promote curing of the polymer base once the compound reaches curing temperature.

Here and hereinafter, the term 'cross-linkable, unsaturated-chain polymer base' is intended to mean any natural or synthetic, non-cross-linked polymer capable of assuming all the chemical-physical and mechanical characteristics typically assumed by elastomers cured with sulphur-based systems.

The recycled rubber is preferably added, untreated, to the compound, i.e. in a form with no polymer bases.

The term 'untreated' is intended to mean the recycled rubber is added as is, and not in a form pre-mixed with a polymer base. When the recycled rubber is pre-mixed with part of a polymer base, the in-use tread porosity achieved proves unsatisfactory. This may be explained by excessive interaction between the recycled rubber and the polymer base.

The size of said recycled rubber preferably ranges between 100 and 200 µm.

The recycled rubber is preferably tyre rubber.

A further object of the present invention is a rubber compound for producing a tread portion designed to assume, with use, a porous surface with a 75 to 800 µm pore area; said compound being characterized by comprising a polymer base, silica, and 5 to 20 phr of recycled rubber; said recycled rubber being 75 to 800 µm in size and pre-treated cryogenically; and said polymer base being selected from SBR, BR, NR and mixtures thereof.

A further object of the present invention is a tread portion designed to assume, with use, a porous surface with a 75 to 800 µm pore area, and characterized by being made from the compound according to the invention.

A further object of the present invention is a winter tyre comprising a tread portion in accordance with the invention.

BRIEF DESCRIPTION OF THE DRAWINGS

The following are purely non-limiting examples to give a clearer understanding of the invention with the aid of FIGS. 1 and 2, which show photographs of a cryogenically treated recycled rubber used in the invention (FIG. 1), and an ambient-temperature-treated recycled rubber (FIG. 2). The FIGS. 1 and 2 photographs were taken using a digital Hirox KH-7700 microscope, and an MX(G)-5040Z lens. As shown clearly in FIGS. 1 and 2, the cryogenically treated recycled rubber has a smooth surface and angular structure, unlike the ambient-temperature-treated recycled rubber, which has a rougher surface and irregular structure. With these surface and structural characteristics, the FIG. 1 recycled rubber has a smaller surface area than the ambient-temperature-treated recycled rubber and, therefore, a smaller contact area with the surrounding rubber matrix when added to the compound.

BEST MODE FOR CARRYING OUT THE INVENTION

Examples

Figure 1:
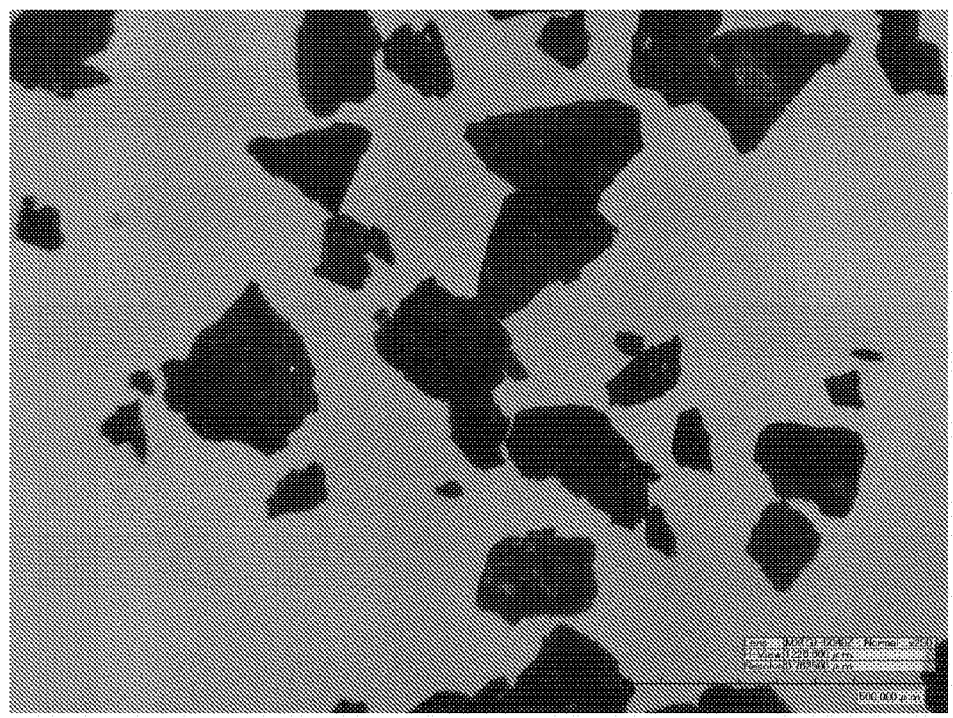
Figure 2:
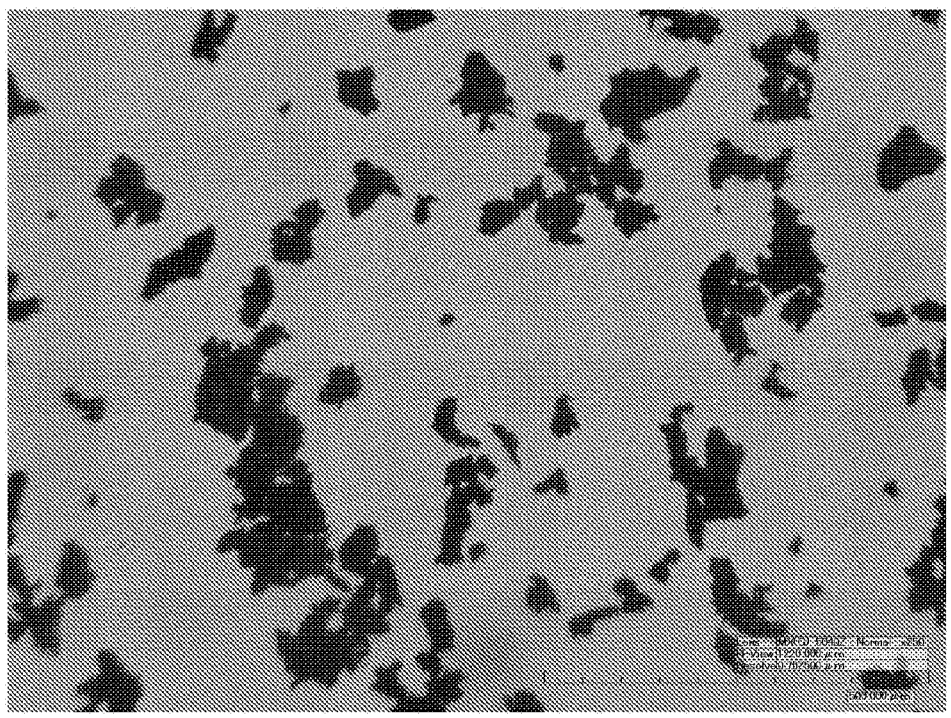

Six compounds (A-F) were produced using the method according to the present invention, the only differences among them being the size (550 or 150 μm) and quantity (5, 10 or 20 phr) of the recycled rubber.

The example compounds were produced as follows:
—Compound Preparation—
(First Mixing Step)

A 230- to 270-liter, tangential-rotor mixer was loaded, before commencing the mixing operation, with the cross-linkable polymer base, recycled rubber, silica, a silane bonding agent, and carbon black, to a fill factor of 66-72%.

The mixer was operated at a speed of 40-60 rpm, and the resulting mix unloaded on reaching a temperature of 140-160° C.

(Second Mixing Step)

The mix from the first step was mixed again in a mixer operated at a speed of 40-60 rpm, and was unloaded on reaching a temperature of 130-150° C.

(Final Mixing Step)

Sulphur and curing agents were added to the mix from the second step, to a fill factor of 63-67%.

The mixer was operated at a speed of 20-40 rpm, and the resulting mix unloaded on reaching a temperature of 100-110° C.

Table I shows the compositions n phr f the six compounds.

TABLE I

|  | A | B | C | D | E | F |
|---|---|---|---|---|---|---|
| Polymer base | | | 100 | | | |
| Silica | | | 58.6 | | | |
| Silane bonding agent | | | 5.0 | | | |
| CB | | | 10.0 | | | |
| Sulphur | | | 2.0 | | | |
| Curing agents | | | 4.0 | | | |
| Antioxidant | | | 2.0 | | | |
| Recycled rubber (a) | 5.0 | 10.0 | 20.0 | — | — | — |
| Recycled rubber (b) | — | — | — | 5.0 | 10.0 | 20.0 |

The polymer base used is a 70-30 blend of SBR and BR rubber.

The silica used is VN3 marketed by Evonik.
The silane bonding agent used is Si75.
The curing agents consisted f MBTS and DPG.
The antioxidant used is 6PPD.
Recycled rubber (a) is cryogenically treated, 150 μm recycled tyre rubber.
Recycled rubber (b) is cryogenically treated, 550 μm recycled tyre rubber.

A tread was made from each of the above compounds; each tread was subjected, under the same conditions, to wear simulating 10,000 km service (wear fleet test); and the pore area percentage was then measured using the digital optical microscope analysis method.

Table II shows the pore area percentage results.

TABLE II

|  | A | B | C | D | E | F |
|---|---|---|---|---|---|---|
| Pore area % | 9.5 | 20.3 | 40.5 | 5.0 | 9.6 | 20.0 |

As shown clearly in Table II, the method according to the present invention allows the pore percentage of the tread to be determined beforehand on the basis of the size and quantity of recycled rubber used in the compound.

More specifically, in the case of compound F, the pore density of the tread is comparable with that of treads produced using known pore-forming methods.

The method according to the present invention has the advantages of recycling a waste product, with obvious ecological and cost benefits; of establishing tread porosity beforehand; and, finally, of eliminating the processing controls involved in known methods.

It is important to stress the difference between the way recycled tyre rubber is used in the method according to the present invention, and the way it is used in known methods. Recycled rubber is being used more and more in tyre compounds, but exclusively for ecological reasons. And, because recycled rubber has been found to pose problems in terms of the mechanical characteristics of the tyre, steps must be taken as regards the composition of the compound to bring the mechanical characteristics of the tyre back to standard. The recycled rubber used in the method according to the present invention, on the other hand, not only achieves the same ecological benefits, but is also of strategic importance in achieving given target tread characteristics.

The invention claimed is:

1. A method for obtaining a tread portion that during its use assumes a porous surface with a 75 to 800 μm$^2$ pore area; said method comprising a preparation phase of a rubber compound, wherein:
   in a first mixing step a polymer base selected from SBR, BR, NR and mixtures thereof, 5 to 20 phr of recycled rubber having 75 to 800 μm in size, and silica are mixed together; and
   in a second mixing step a curing system is added and mixed to the compound from the first mixing step;
   said method being characterized by the fact that said recycled rubber is treated beforehand cryogenically and is added to said first mixing step without being beforehand pre-mixed with any polymer base.

2. A method as claimed in claim 1, characterized in that said recycled rubber is 100 to 200 μm in size.

3. A method of producing tread compounds, as claimed in claim 1, characterized in that said recycled rubber is tyre rubber.

* * * * *